E. A. Locke.
Cask-Label.
Nº 75934.      Patented Mar. 24, 1868.
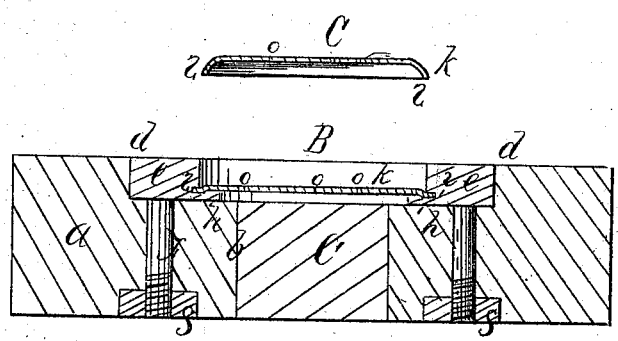
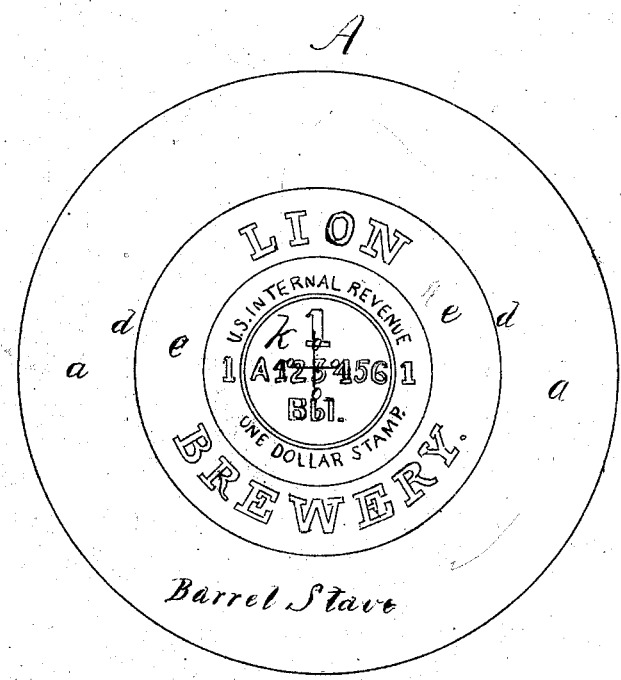
Barrel Stave
Witnesses
S. B. Kidder
M. W. Frothingham
Inventor
E. A. Locke,
by his Attys
Crosby Halstead & Gould

United States Patent Office.

EDWARD A. LOCKE, OF BOSTON, MASSACHUSETTS.

Letters Patent No. 75,934, dated March 24, 1868.

---

IMPROVEMENT IN CASK-LABELS.

---

The Schedule referred to in these Letters Patent and making part of the same.

---

TO ALL WHOM IT MAY CONCERN:

Be it known that I, EDWARD A. LOCKE, of Boston, in the county of Suffolk, and State of Massachusetts, have invented an Improved Identifying Mark for Casks; and I do hereby declare that the following, taken in connection with the drawings which accompany and form part of this specification, is a description of my invention sufficient to enable those skilled in the art to practise it.

The invention has particular reference to sealing liquor-casks with identifying or revenue-marks or labels, which, while serving the purpose of identification, are necessarily destroyed by application of a spigot or faucet to the barrel.

My invention consists in a metal ring, to be applied around the faucet or spigot-hole of a cask, set in a recess in the stave or head, this ring having, at the bottom of the opening through it, an inwardly-projecting flange, upon which is placed a thin metal disk, containing (preferably embossed thereupon) the figures, marks, or letters with which the cask is to be labelled, and by which it or its contents, or some other facts regarding the cask, are to be identified or substantiated, this disk having a lip on its edge, which lip, by striking down the disk, is expanded into a groove in the ring; such expansion sealing the cask.

The drawings represent my invention embodied upon a portion of a barrel-stave or head.

A shows an outside view, and B a central section of the ring and disk. $a$ denotes the stave, $b$ the hole therein, to which the spigot is to be applied, this hole being shown as stopped by a small bung or stopper, $c$. In the outer surface of the cask, concentric with the hole $b$, a recess, $d$, is sunk, this recess being of depth sufficient to receive a metal ring, $e$, fitting snugly into the recess, as seen at B. The ring is held in place by screw-bolts or pins, $f$, projecting from it through the stave or head, and nuts $g$, screwed upon the bolts on the inner side of the stave, the ring being thus applied when the cask is made, or when one of the heads thereof has been removed.

On the inner surface of the ring, and at the bottom part thereof, is a flange, $h$, projecting towards the aperture $b$. At the angle of this flange and the inner surface of the ring, is a groove, $i$, extending into the ring, as seen at B. The flange $h$ supports the identifying-disk $k$, this disk being preferably a round, thin sheet of metal, having embossed upon it letters or figures, or both, as seen at A. A lip, $l$, is formed at the edge of this disk, (as seen at C, which is a cross-section of the disk, previous to its application,) this lip being made at such an angle with the disk, that by pressing down the disk upon the bed or flange $h$ the lip $l$ is flattened and expanded. The disk $k$, being made of diameter corresponding to the inner diameter of the ring $e$, it will be obvious that if the disk be dropped into the ring $e$, and a tool be then applied which shall compress the disk down against the flange $h$, the lip $l$ will be driven outwardly and into the groove $i$, as seen at B, this position of the lip securing the disk to the cask in such manner that it can only be removed by destroying it, or by such mutilation as will prevent its being again used.

To insure the cancellation of the stamp, the disk may be slit, or otherwise perforated, from its centre, as seen at $o$, the metal in the angle made by each two adjacent slits easily giving way as the end of the spigot is driven against the disk, the metal in line with the slits rending as the spigot is forced into the cask, thus effecting the destruction or cancellation of the disk.

Letters Patent of the United States, No. 58,847, were granted to me, October 16, 1866, for an identifying-mark for casks and boxes, such "mark" consisting of a disk or plate of metal, having a lip turned down from its edge, this disk or plate being placed in a recess sunk in the surface of the cask, so that the lip was driven into the wood around the recess, when the face of the disk was forced down against the surface of the cask.

My present invention is an improvement upon such patented means of marking casks, in that a groove is made for the reception of the lip of the disk or plate, and in that the recess for receiving the disk or plate, and the groove for receiving the lip, are made in a metal ring, which admits of the use of numberless successive disks in connection with the same recess for receiving the plate.

The above patented mark answers for the permanent application of the same to a cask or box, or for the application of a mark at a part of the cask or box not to be repeatedly used for the same purpose. But where a spigot-hole or a bung-hole is to be sealed, some provision is desirable by which the hole may be repeatedly sealed and unsealed, without impairing the surface, into connection with which the edges of the plate are brought, and this provision is made by the metal ring with its flange and groove, as seen in my present invention. The outer surface of the ring may be used for permanent letters or marks, as shown at A. The disk e may be secured directly upon the outer surface of the stave or head, (instead of being sunk in the recess i,) and it may be otherwise secured than by the bolts and nuts, but the manner of applying and securing it, as shown, is preferred.

I claim the metal ring, with its flange and groove, for receiving an identifying-disk or plate to be applied to a cask, substantially as set forth.

I also claim forming the disk k, with the slits o, substantially as and for the purpose set forth.

EDWARD A. LOCKE.

Witnesses:
FRANCIS GOULD,
J. B. CROSBY.